Nov. 22, 1949     W. D. THOMPSON     2,488,996
FISH BAIT RETRIEVING DEVICE
Filed Oct. 13, 1948

INVENTOR:
WALDO DUFF THOMPSON
per
ATTORNEY

Patented Nov. 22, 1949

2,488,996

UNITED STATES PATENT OFFICE 2,488,996

FISH BAIT RETRIEVING DEVICE

Waldo Duff Thompson, London, Ontario, Canada

Application October 13, 1948, Serial No. 54,229

3 Claims. (Cl. 43—30)

My invention relates to fishing apparatus and more particularly to a device for releasing a hook which has become snagged.

In fishing with line and bait, the hooks on the bait are liable to become caught on some obstruction. As the plugs or bait and associated parts are of considerable value, the fisherman spends considerable time trying to release them and his efforts frequently result in their loss. The object of my invention is to provide a device of a size convenient to be carried with the fishing equipment, which is of a simple nature, which may be quickly and easily applied to the fish line and lowered thereon to the snagged bait, and there manipulated by the fisherman to release it.

Figure 1:
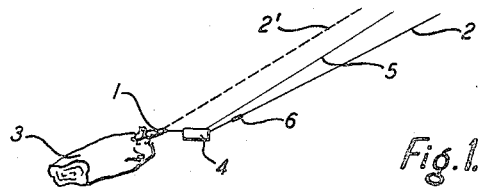
Figure 2:
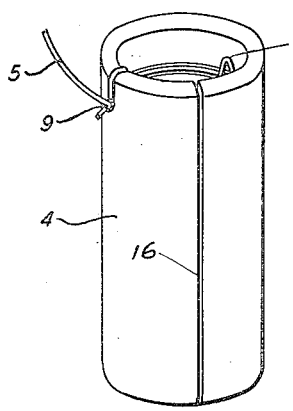
Figure 3:
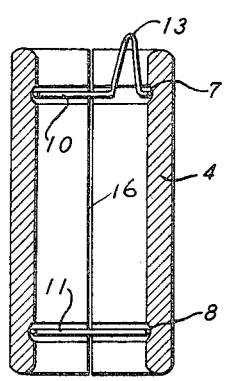
Figure 4:
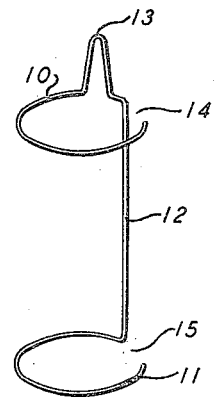
Figure 5:
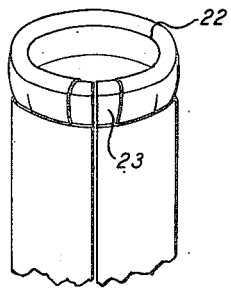

An understanding of my invention, the merits and advantages thereof, will be had from the following detail description of embodiments thereof taken with the accompanying drawings in which Fig. 1 is a schematic showing on a small scale illustrating the manner of use of my invention; Fig. 2 is a perspective view; Fig. 3 is a cross-sectional view taken on the central longitudinal axis of the device of Fig. 2; Fig. 4 is a perspective view of a part; Fig. 5 is a perspective view of a modification and Fig. 6 is a longitudinal sectional view of Fig. 5.

Referring to Fig. 1, I have shown a fish bait 1 on its line 2 and snagged in an obstacle 3. Reference character 4 represents the hook releasing device of my invention which has been lowered down the fish line 2 by a line 5 attached thereto. The position of the fish line in taut condition without the hook releasing device 4 in use is illustrated by the dotted line 2'. The device 4 consists of a heavy hollow cylinder with a bore of sufficient diameter to pass over sinkers 6 and the like which may be attached to the fish line and to permit it to reach a position adjacent the snagged bait as shown. It will be apparent that the device 4 by its weight may release the hook and that the fisherman may, if necessary, manipulate it by means of its line 5 till the hook is cleared.

Referring to Figs. 2, 3 and 4 which show an embodiment of my invention, 4 represents a hollow cylinder of heavy material for example brass, the bore of which is of substantial diameter, preferably over three quarters of an inch. To permit the easy application of the cylinder 4 to the fish line, it is provided with a longitudinal slot 7 of sufficient width to pass over the line. On the interior surface of the hollow cylinder 4 circumferential grooves 7 and 8 are provided adjacent the ends thereof. A hole 9 is provided near the upper edge of the cylinder and spaced a substantial distance from the slot whereby the control line 5 may be attached. To prevent the line from entering the slot and becoming bound and to prevent the cylinder from becoming detached from the line during operation, I have provided a means for bridging the interior end of the slot. A member shown in perspective in Fig. 4 is mounted on the interior surface of the cylinder 4 in a manner such that it may be readily moved between a position such that the slot is clear and in which the cylinder may be applied to the line, and another position in which it bridges the slot as shown in Fig. 3. The member is made from a continuous length of stiff spring wire bent to provide a pair of spaced apart incomplete spring rings 10, and 11, joined by a straight section 12. The upper ring 10 is bent as shown to provide an operating detent 13. The member of Fig. 4 is inserted into the bore of the cylinder to a position where the spring rings 10 and 11 occupy the grooves 7 and 8 and with the connecting leg 12 lying on the interior surface. The operating detent 13 projects beyond the end of the cylinder where it may be readily moved by the finger from a position in which the gaps 14 and 15 in the rings 10 and 11 lie coincident with the slot permitting the application of the cylinder to the line, to a second position where the rings 10 and 11 block the entrance of the line into the slot.

Figure 6:
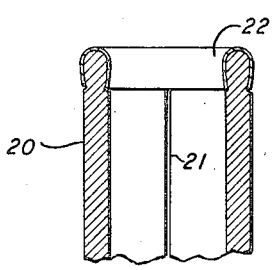

In Figs. 5 and 6, I have shown a modification of the closing means. Cylinder 20 is provided with a slot 21 in the same manner as in Figs. 2 to 4. The split ring 22 is substantially U-shaped in cross-section and is applied to the upper edge of the cylinder. The opposing edges of the ring 22 are slightly inturned to engage corresponding undercut grooves in the walls of the cylinder whereby it may be snapped into position over the end of the cylinder but will be retained against inadvertent removal during operation of the device. The ring 22 may be rotated from the position shown in Fig. 5, where its gap is lined up with the slot 21 to another position as seen in Fig. 6 where it blocks the slot. In the drawings one end only of the cylinder is shown. It is understood a similar split ring is applied to the other end. The rings may be knurled or provided with detents to facilitate rotation thereof.

While specific forms of this invention have been shown and described, it is not desired to limit the invention to the particular construction shown, and it is intended by the appended claims to cover all modifications within the spirit and scope of this invention.

What I claim as new and desire to secure by Letters Patent of the United States is:

1. A fishing bait retrieving device comprising a hollow cylinder of heavy material provided with a bore and a slot extending from end to end of the cylinder and leading to the bore, said slot having a width sufficient to pass a fish line therethrough, means mounted on the cylinder and movable thereon from a position such that the slot is unobstructed to another position in which said means obstructs the removal of the line from the bore, said cylinder having a plurality of circumferential grooves on the interior surface thereof with one groove adjacent each end thereof and said movable means comprising a unit having a plurality of resilient split rings adapted to seat in the grooves and a shank interconnecting said rings.

2. A fishing bait retrieving device as claimed in claim 1 in which the movable means includes an operating member projecting therefrom beyond the end of the cylinder.

3. A fishing bait retrieving device as claimed in claim 1 in which the movable means comprising the split rings and interconnecting shank are made from a continuous strip of spring wire and in which one of the rings is deformed to provide an operating detent projecting beyond the end of the cylinder.

WALDO DUFF THOMPSON.

REFERENCES CITED

The following references are of record in the file of this patent:

UNITED STATES PATENTS

| Number | Name | Date |
|---|---|---|
| 1,048,983 | Madden | Dec. 31, 1912 |
| 2,385,415 | Jackson | Sept. 25, 1945 |